United States Patent [19]

Ohsato

[11] Patent Number: 4,775,968
[45] Date of Patent: Oct. 4, 1988

[54] TRACKING ERROR DETECTING SYSTEM FOR OPTICAL HEAD

[75] Inventor: Kiyoshi Ohsato, Shinagawa, Japan

[73] Assignee: Sony Corporation, Tokyo, Japan

[21] Appl. No.: 878,289

[22] PCT Filed: Oct. 3, 1985

[86] PCT No.: PCT/JP85/00546

§ 371 Date: Jun. 13, 1986

§ 102(e) Date: Jun. 13, 1986

[87] PCT Pub. No.: WO86/02479

PCT Pub. Date: Apr. 24, 1986

[30] Foreign Application Priority Data

Oct. 15, 1984 [JP] Japan ................................ 59-215860

[51] Int. Cl.$^4$ .............................................. G11B 7/00
[52] U.S. Cl. .................................................... 369/46
[58] Field of Search ...................... 250/201; 358/342;
369/43–47

[56] References Cited

U.S. PATENT DOCUMENTS 4,037,252 7/1977 Janssen .
4,065,786 12/1977 Stewart ................................ 369/46

FOREIGN PATENT DOCUMENTS 52-145006 2/1977 Japan .
58-185045 10/1983 Japan .
58-208939 12/1983 Japan .
59-14148 1/1984 Japan .
59-58638 4/1984 Japan .
59-172171 9/1984 Japan .

Primary Examiner—Robert L. Richardson
Attorney, Agent, or Firm—Hill, Van Santen, Steadman & Simpson

[57] ABSTRACT

According to a tracking error system of an optical head of the present invention, a pair of beams are irradiated through an objective lens (4) on an optical record medium (5) with a distance of a multiple of an odd number of substantially ½ the track pitch thereof, a pair of beams emitted from the optical record medium (5) are respectively introduced into a pair of two-divided photo detection elements ($6_1$) and ($6_2$) and a tracking error signal is obtained from a difference between difference outputs between outputs of both detected outputs from the pair of respective two-divided photo detection elements ($6_1$) and ($6_2$). Thus, it is possible to remove a DC fluctuation of a tracking error signal caused by the lateral movement of the objective lens (4) and a radial skew of the optical record medium (5).

3 Claims, 6 Drawing Sheets

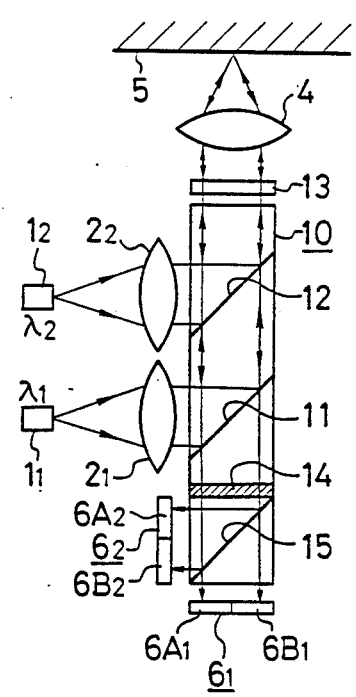
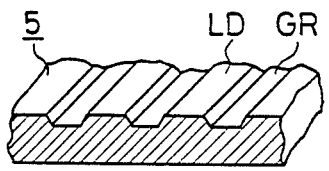
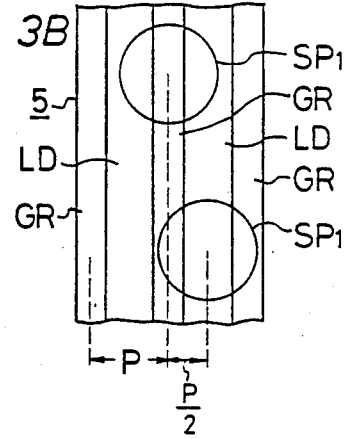
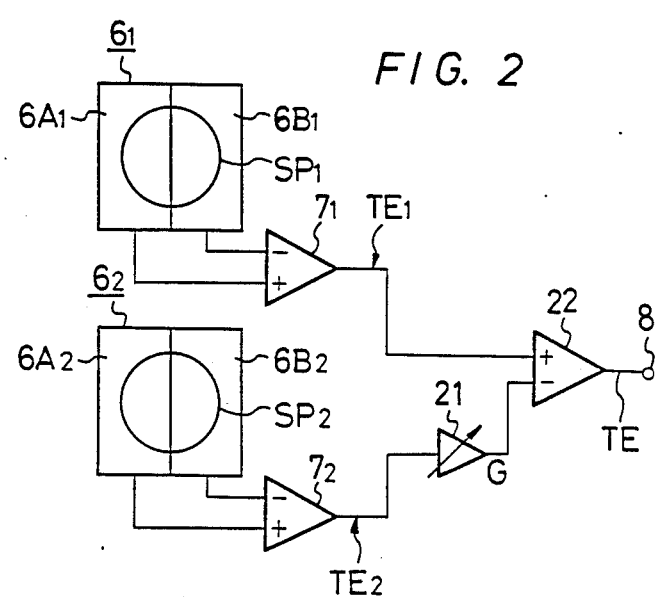

TRACKING ERROR DETECTING SYSTEM FOR OPTICAL HEAD

TECHNICAL FIELD

This invention relates to a tracking error detecting system of a so-called push-pull system for an optical head.

BACKGROUND ART

Referring to FIG. 11, a prior art optical tracking error detecting system will be described hereinafter. Reference numeral 1 designates a semiconductor laser element (laser diode) used as a laser light source. When a diverged laser beam therefrom passes through a collimator lens 2, it is made as a parallel beam. This parallel beam is deflected by 90° by a beam splitter 3 and then introduced to an objective lens 4. A converged beam from this objective lens 4 is irradiated on an optical disc provided as an optical record medium and is focused thereon. A beam emitted from this optical disc 5, that is, a reflected beam is introduced again to the objective lens 4 in which it is collimated to a parallel beam, which passes through the beam splitter 3 to a two-divided photo detector 6. As used herein, the term "two-divided photo detector" will be used to refer to a pair of photo detectors of like characteristics in side-by-side relationship.

This two-divided photo detector 6 is formed of two photo detection sections 6A and 6B as shown in FIG. 12. When a circular spot SP formed by the parallel beam from the objective lens 4 is located over the two photo detection sections 6A and 6B by just half the converged beam from the objective lens 4 scans just the center of the track on the optical disc 5. Accordingly, if both the detected outputs from these two photo detection sections 6A and 6B are supplied to a differential amplifier 7 and thereby a difference therebetween is calculated, a tracking error signal is developed at an output terminal 8.

In such prior art optical type head tracking error detecting system, however, as shown by a broken line in FIG. 11, if the objective lens 4 is moved in parallel relation to the optical disc 5, since the two-divided photo detector 6 is fixed, the position of the spot SP focused thereon is displaced as shown by a broken line in FIG. 12, producing a DC fluctuated component in the tracking error signal from the output terminal 8. In other words, if the position of the objective lens 4 is displaced as shown in FIG. 4A, the DC component of the tracking error signal is fluctuated as shown in FIG. 4B.

Further, if a radial skew takes place in the optical disc 5 as shown by a broken line in FIG. 13, since the two-divided photo detector 6 is fixed similarly, the position of the spot SP focused thereon is displaced as shown by a broken line in FIG. 14, producing a DC fluctuated component in the tracking error signal from the output terminal 8. Accordingly, also in this case, the DC component of the tracking error signal is fluctuated as shown in FIG. 4B.

In view of such aspect, the present invention is intended to provide a tracking error detecting system of an optical type head which can remove a DC fluctuation in a tracking error signal caused by the lateral movement of an objective lens and a radial skew of an optical record medium.

DISCLOSURE OF THE INVENTION

A tracking error detection system of an optical head according to this invention is characterized in that a pair of beams are irradiated through an objective lens on an optical record medium with a distance of an odd multiple of substantially ½ of the track pitch thereof, a pair of beams emitted from the optical record medium are respectively introduced into a pair of two-divided photo detection elements and a tracking error signal is obtained from a differene of respective difference outputs of both detected outputs from the pair of two-divided photo detection elements.

BRIEF DESCRIPTION OF DRAWINGS

Fig 1 is a location representation showing a mechanical arrangement of one embodiment of the system according to this invention, FIG. 2 is a circuit diagram showing a circuit arrangement thereof, FIGS. 3A and 3B are location representations showing a positional relationship of an optical disc thereof and a beam spot formed thereon.

BEST MODE FOR CARRYING OUT THE INVENTION

Figure 4A:
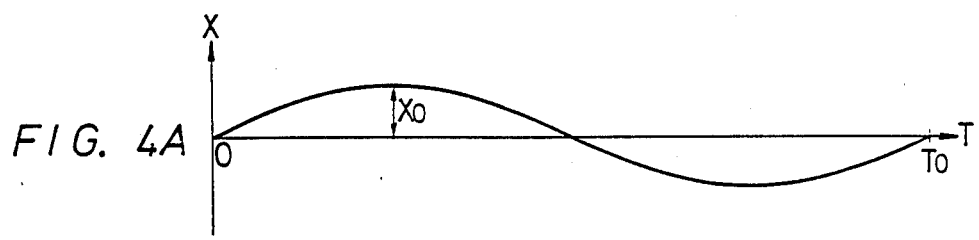
FIGS. 4A through 4D are waveform diagrams used to explain the operation of the embodiment of the present invention and of the prior art example.
Figure 4B:
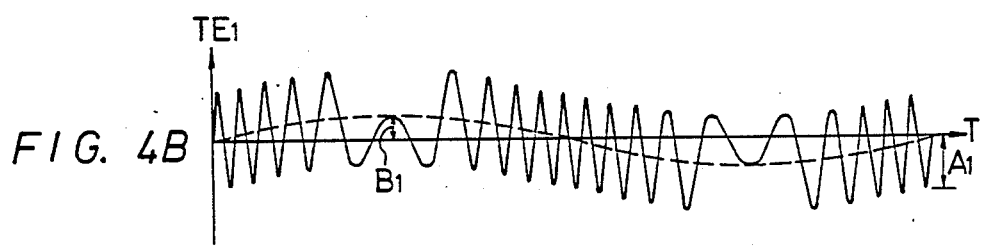
Figure 4C:
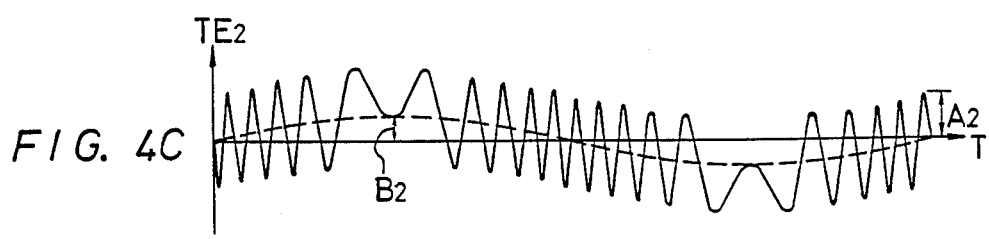
Figure 4D:
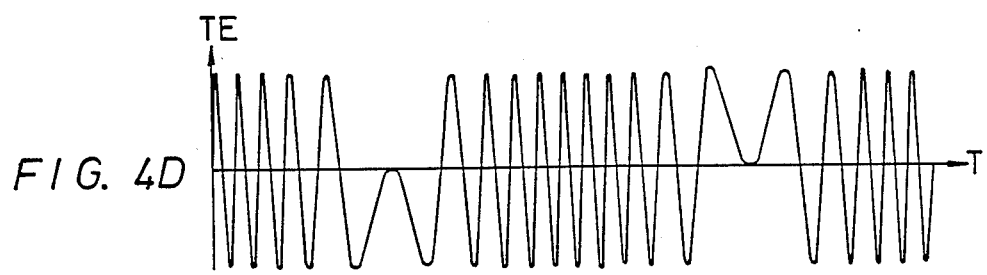

Referring to FIG. 1, one embodiment of this invention will hereinafter be described in detail. In FIG. 1, reference numerals $1_1$ and $1_2$ respectively designate semiconductor laser elements (laser diodes) the wavelengths of which are different from each other as $\lambda_1$ and $\lambda_2$. Diverged laser beams therefrom are introduced respectively to collimator lens $2_1$ and $2_2$ and thereby collimated as parallel beams.

Reference numeral 10 designates an otpical element in which a dichroic mirror 15, a ½ wavelength plate 14, a polarizing beam splitter 11 and a dichroic mirror 12 are formed as one component in this order from the bottom to the top in the figure.

Then, the parallel beam from the collimator lens $2_2$ 2 is deflected by 90° by the dichroic mirror 12 and introduced through a ¼ wavelength plate 13 to an objective lens 4. The converged beam therefrom is made incident on an optical disc 5. Further, the parallel beam from the collimator lens $2_1$ is deflected by 90° by the polarizing beam splitter 11 and then introduced through the dichroic mirror 12 and the ¼ wavelength plate 13 to the objective lens 4. The converged beam therefrom is made incident on the optical disc 5.

The beam reflected by the optical disc 5 is introduced into the objective lens 4 and thereby made a parallel beam. The parallel beam is introduced through the ¼ wavelength plate 13, the dichroic mirror 12 and the polarizing beam splitter 11 to the ½ wavelength plate 14. Of the beams from the ½ wavelength plate 14, the beam having the wavelength $\lambda_1$ passes through the dichroic mirror 15 to one two-divided photo detector $6_1$, while the beam having the wavelength $\lambda_2$ is deflected by 90° by the dichroic mirror 15 and then introduced into another two-divided photo detector $6_2$.

Subsequently, the positional relationship of the beams formed on the optical disc 5 will be described with reference to FIG. 3. The optical disc 5 in this case, includes pre-grooves GR of a spiral shape on which an information signal is to be recorded and a land portion LD provided therebetween as shown in FIG. 3A. A recording track is formed on this pre-groove GR. In FIG. 3B, reference letter P designates a track pitch. When the semiconductor laser elements $1_1$ and $1_2$ are positioned, the spacing between the spot $SP_1$ of the beam having the wavelength $\lambda_1$ and the spot $SP_2$ of the beam having the wavelength $\lambda_2$ each of which is derived from the objective lens 4 is set as just a ½ of the track pitch P.

According to the arrangement of the embodiment of this invention shown in FIG. 1, the two-divided photo detectors $6_1$ and $6_2$ can be located with ease and they can be positioned with accuracy not so high.

The circuit system of this embodiment will be described with reference to FIG. 2. Both detected outputs from the two photo detecting sections $6A_1$ and $6B_1$ of one two-divided photo detector $6_1$ are supplied to a differential amplifier $7_1$ from which a difference output $TE_1$ is derived. Both detected outputs of the two photo detectors $6A_2$ and $6B_2$ of another two-divided photo detector $6_2$ are supplied to a differential amplifier $7_2$ from which a difference output $TE_2$ is derived. The difference output $TE_1$ from the differential amplifier $7_1$ is supplied to other differential amplifier 22. The output $TE_2$ from the differential amplifier $7_2$ is supplied through a variable gain amplifier (gain thereof is taken as G) 21 to the differential amplifier 22 and a difference output TE therefrom is delivered to the output terminal 8 as the tracking error signal.

Referring to FIG. 4, the fact that the tracking error signal obtained from the differential amplifier 22 contains no DC fluctuation substantially will be described by using the equations.

First, a moving position X (see FIG. 4A) of the objective lens 4 is expressed by the following equation.

$$X = X_0 \sin(2\pi T/T_0)$$

where $X_0$ is the amplitude, T is the time and $T_0$ is the period.

Accordingly, the difference output $TE_1$ (see FIG. 4B) of the differential amplifier $7_1$ is expressed by the following equation.

$$TE_1 = A_1 \sin(2\pi X/P) + B_1 \sin(2\pi T/T_0)$$

where $A_1$ is the amplitude of the traverse signal component and $B_1$ the amplitude of the DC fluctuating component.

Further, the difference output $TE_2$ (see FIG. 4C) of the differential amplifier $7_2$ is expressed by the equation below.

$$\begin{aligned}TE_2 &= A_2 \sin\{2\pi(X + P/2)/P\} + B_2 \sin(2\pi T/T_0)\\ &= -A_2 \sin(2\pi X/P) + B_2 \sin(2\pi T/T_0)\end{aligned}$$

The gain G of the variable gain amplifier 21 is set at $B_1/B_2$. Accordingly, the difference output TE (see FIG. 4D) of the differential amplifier 22 is expressed by the following equation.

$$\begin{aligned}TE &= TE_1 - (B_1/B_2) TE_2\\ &= \{A_1 + (B_1/B_2) A_2\} \cdot \sin(2\pi X/P)\end{aligned}$$

From this equation, it is understood that the tracking error signal developed at the output terminal 8 in FIG. 2 does not contain the DC fluctuating component.

An other embodiment of the present invention will be described with reference to FIG. 5. The diverged laser beam from the semiconductor laser element 1 is introduced into the collimator lens 2 and thereby collimated as a parallel beam. Then, the parallel beam is introduced into a diffraction grating 17 and thereby separated to a 0-order beam, a +1-order beam and a -1st-order beam, respectively. These beams are introduced through the polarizing beam splitter 11 and a -¼ wavelength plate 13 to the objective lens 4 and the converged beam therefrom is irradiated on the optical disc 5. The reflected beam from the optical disc 5 is introduced into the objective lens 4 and thereby made as a parallel beam. The parallel beam therefrom is passed through the ¼ wavelength plate 13 to the polarizing beam splitter 11 in which it is deflected by 90°, converged by a converging lens 18 and then introduced to the two-divided photo detector 6. This two-divided photo detector 6 is formed of two-divided photo detectors $6_1$ and $6_2$, as shown in FIG. 6.

Figure 7:
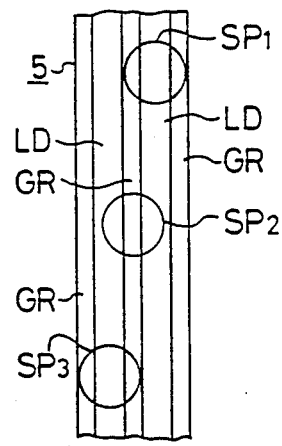
FIG. 7 is a location representation showing a positional relationship of the optical disc thereof and the beam spot formed thereon.

On the optical disc 5, there are formed spots $SP_2$, $SP_1$ and $SP_3$ corresponding to the 0−order, +1−order and −1−order beams as shown in FIG. 7, respectively. By rotating the diffraction grating 17, the distance between the spots $SP_1$ and $SP_2$ is set as a ½ of the track pitch P and these spots are detected by the two-divided photo detectors $6_1$ and $6_2$. The spot $SP_3$ is not used as the tracking error detection but used as the writing or reading of the data.

Since the arrangement of the electrical system is made similarly as described in FIG. 2, the overlapping explanation thereof will be omitted.

According to this embodiment, the single semiconductor laser element may be sufficient and both the two-divided photo detectors are arranged on the same plane so that the tolerance of the position of the spot relative to the movement of the two-divided photo detectors becomes large and so on.

Figure 8:
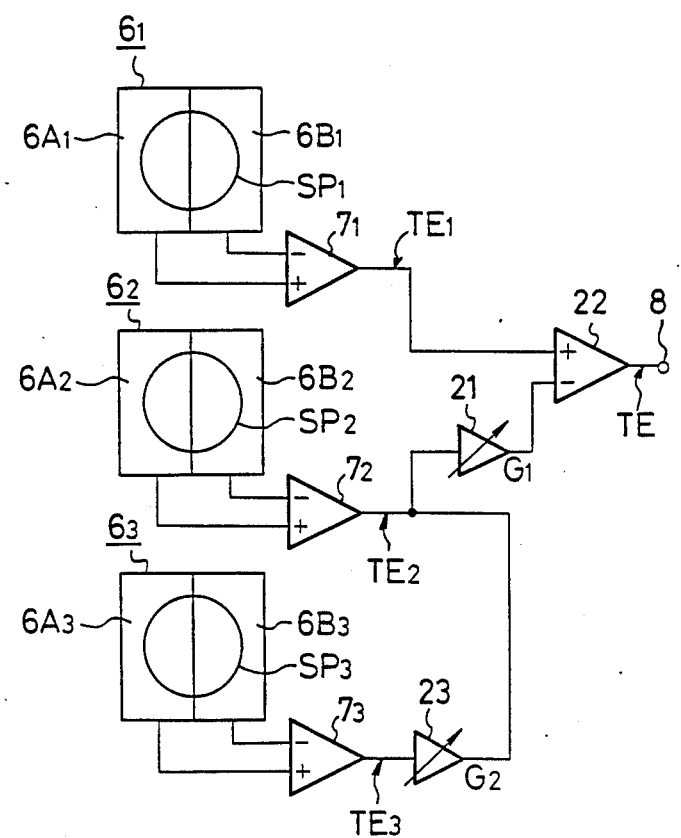
FIG. 8 is a circuit diagram showing a circuit arrangement of other embodiment of the present invention.

In the above mentioned embodiment, if the distance between the spots on the optical disc is not selected as ½ the track pitch strictly, the DC fluctuation of the tracking error signal can not be removed completely. Therefore, referring to FIG. 8, such an embodiment will be described, in which the DC component can be positively removed without strictly setting the distance between the spots on the optical disc 5 as ½ the track pitch P.

Figure 5:
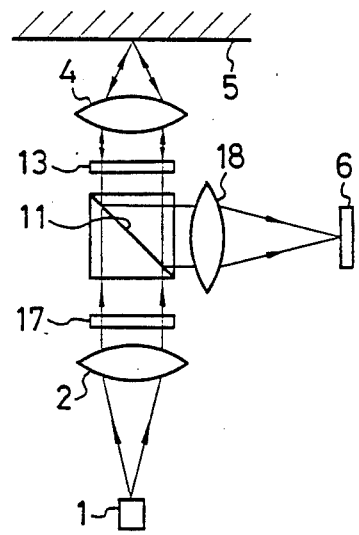
FIG. 5 is a location diagram showing a mechanical arrangement of other embodiment of the system according to this invention.
Figure 6A:
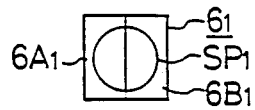
FIGS. 6A through 6C is a location representation of a two-divided photo detector thereof and a spot formed thereon.
Figure 6B:
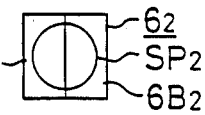
Figure 6C:
Figure 9:
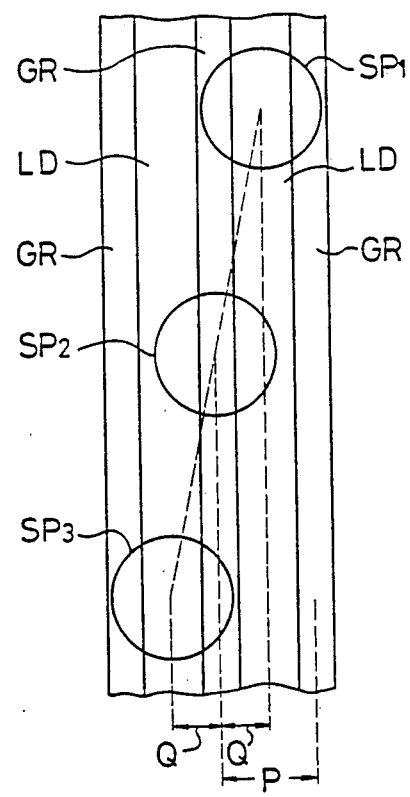
FIG. 9 is a location representation showing a positional relationship of the optical disc thereof and the beam spot formed thereon, FIG. is a graph showing the characteristics thereof.

That is, while in the embodiment in FIG. 5 the spots $SP_2$, $SP_1$ and $SP_3$ corresponding to the 0−order, +1−order and −1−order beams are formed on the optical disc 5 as shown in FIGS. 7 and 9, the distance among these spots $SP_1$, $SP_2$ and $SP_3$ are set as Q which is approximately equal to the ½ of the track pitch P and these spots are detected by two-divided photo detectors $6_1$, $6_2$ and $6_3$.

Both detected outputs from the two-divided photo detection sections $6A_1$ and $6B_1$ of the first two-divided photo detector $6_1$ are supplied to the differential amplifier $7_1$ from which the difference output $TE_1$ is derived. Both detected outputs from the two-divided photo detection sections $6A_2$ and $6B_2$ of the second two-divided photo detector $6_2$ are supplied to the differential amplifier $7_2$ from which a difference output $TE_2$ is derived. Both detected outputs from two-divided photo detection sections $6A_3$ and $6B_3$ of the third two-divided photo detector $6_3$ are supplied to a differential amplifier $7_3$ from which a difference output $TE_3$ is derived. The difference output $TE_1$ from the differential amplifier $7_1$ is supplied to other differential amplifier 22. The output $TE_2$ from the differential amplifier $7_2$ and an output, which is derived from the differential amplifier $7_1$ and passed through a variable gain amplifier (gain thereof is taken as $G_2$) 23, are added together. The added output is supplied through the variable gain amplifier (gain thereof is taken as $G_1$) 21 to the differential amplifier 22. Then, the difference output TE from the differential amplifier 22 is delivered to the output terminal 8 as the tracking error signal.

Subsequently, the fact that the tracking error signal obtained from this differential amplifier 22 contains no DC fluctuation will be explained with reference to equations.

The difference output $TE_1$ of the differential amplifier $7_1$ is expressed by the following equation.

$$TE_1 = A_1 \sin(2\pi X/P) + B_1 \sin(2\pi T/T_0)$$

Further, the difference output $TE_2$ of the differential amplifier $7_2$ is expressed by the following equation.

$$TE_2 = A_2 \sin\{2\pi(X+Q)/P\} + B_2 \sin(2\pi T/T_0)$$

Also, the difference output $TE_3$ of the differential amplifier $7_3$ is expressed by the following equation.

$$TE_3 = A_3 \sin\{2\pi(X-Q)/P\} + B_3 \sin(2\pi T/T_0)$$

Since the modulation degrees and the DC fluctuations of the three spots $SP_1$, $SP_2$ ans $SP_3$ are equal, the following equation is established.

$$B_1/A_1 = B_2/A_2 = B_3/A_3$$

Further, if the gains of the variable gain amplifiers 21 and 23 are respectively selected as $$A_1/2A_2 \text{ and } A_2/A_3$$

the tracking error signal TE from the differential amplifier 22 is expressed by the following equation.

$$\begin{aligned} TE &= TE_1 - (A_1/2A_2)\{TE_2 + (A_2/A_3)\, TE_3\} \\ &= A_1\{1 - \cos(2\pi Q/P)\} \cdot \sin(2\pi X/P) \end{aligned}$$

Figure 10:
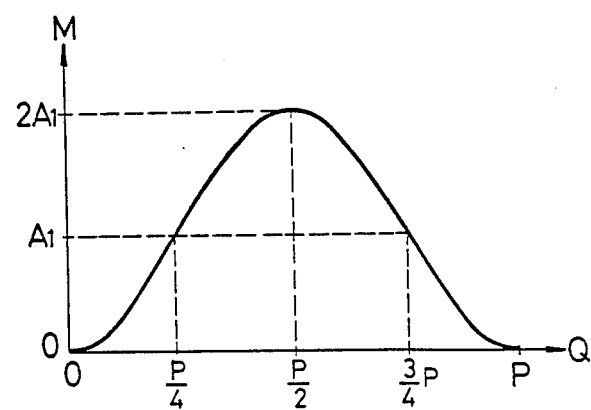
Figure 11:
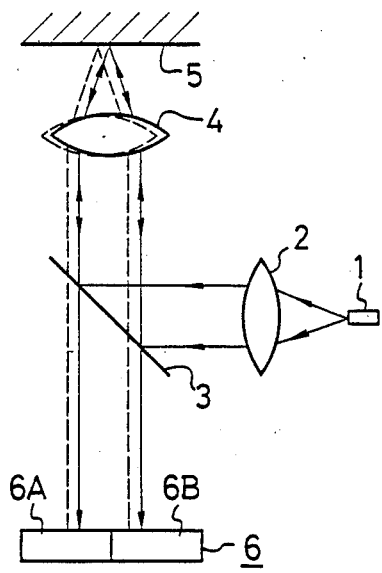
FIGS. 11 and 12 are respectively a location representation showing a mechanical arrangement of the prior art optical type head tracking error detecting system and the circuit arrangement thereof.
Figure 13:
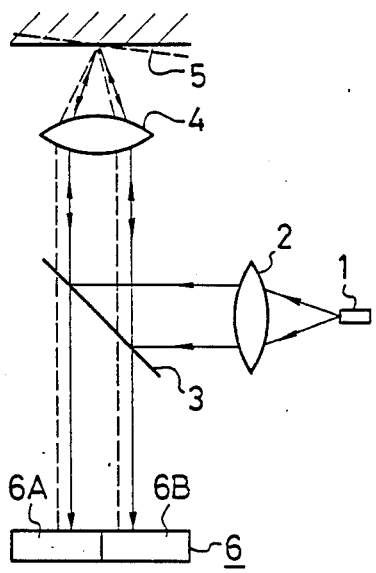
FIGS. 13 and 14 are a location representation and a circuit diagram respectively corresponding to FIGS. 11 and 12 used to explain the operation thereof.
Figure 12:
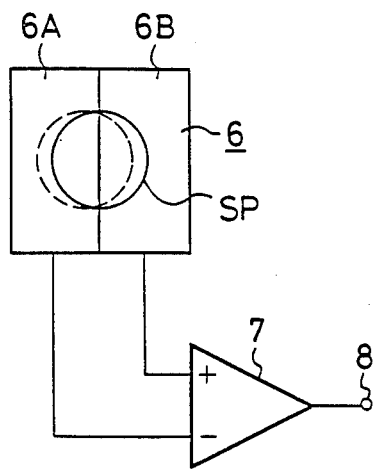
Figure 14:
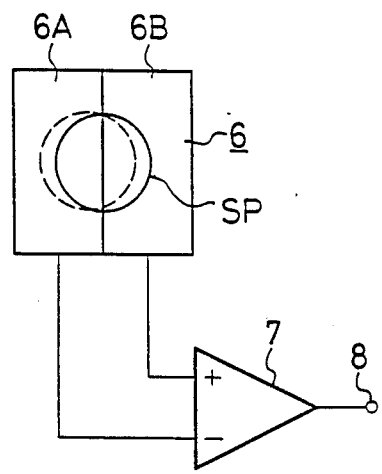

As will be clear from this equation, it can be understood that regardless of Q, the tracking error signal TE does not contain the DC fluctuation. However, although the modulation degree M expressed as $$M = A_1\{1 - \cos(2\pi Q/P)\}$$

is changed as the value of Q as shown in FIG. 10, it becomes maximum when Q=P/2, while it becomes minimum (zero) when Q=O and Q=P.

According to the present invention as set forth above, it is possible to obtain the tracking error detecting system of the optical head which can remove the DC fluctuation in the tracking error signal caused by the lateral movement of the objective lens and the radial skew of the optical record medium.

What is claimed is:

1. In an optical storage device having means for reading or writing information on plural adjacent tracks on an optical record medium, and means for tracking a path along one of said tracks, a tracking error detection system comprising, in combination, means for forming a pair of beams and focusing said beams through an objective lens onto said optical record medium with a distance equal to an odd multiple of substantially one half of the distance between adjacent tracks, first and second pairs of side-by-side photo detection elements, means for conducting a pair of beams emitted from said optical record medium onto said photo detection elements, means for deriving a first difference signal in response to signals from said first pair of photo detection elements, means for deriving a second difference signal in response to signals from said second pair of photo detection elements, and means connected to both of said deriving means for generating a tracking error in response to the difference between said first and second difference signals.

2. A tracking error detection system according to claim 1, both pairs of photo detection elements are formed on the same plane.

3. A tracking error detection system according to claim 4, wherein said beam forming means comprises a single semiconductor laser element, and a diffraction grating positioned relative to said laser element to transmit a beam from said laser element to form said two beams.

* * * * *